United States Patent
Kesavan et al.

(10) Patent No.: US 11,092,205 B2
(45) Date of Patent: *Aug. 17, 2021

(54) FRICTION MATERIAL

(71) Applicant: AKEBONO BRAKE INDUSTRY CO., LTD., Tokyo (JP)

(72) Inventors: Sunil Kesavan, Novi, MI (US); Xinming Shao, Bellevue, WA (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,139

(22) Filed: May 11, 2020

(65) Prior Publication Data

US 2020/0271178 A1    Aug. 27, 2020

Related U.S. Application Data

(63) Continuation of application No. 16/257,377, filed on Jan. 25, 2019, now Pat. No. 10,690,207, which is a continuation of application No. 15/257,224, filed on Sep. 6, 2016, now Pat. No. 10,233,988.

(60) Provisional application No. 62/222,336, filed on Sep. 23, 2015.

(51) Int. Cl.
*F16D 69/02*    (2006.01)

(52) U.S. Cl.
CPC ......... *F16D 69/026* (2013.01); *F16D 69/025* (2013.01); *F16D 2200/0008* (2013.01); *F16D 2200/0026* (2013.01); *F16D 2200/0034* (2013.01); *F16D 2200/0056* (2013.01); *F16D 2200/0065* (2013.01); *F16D 2200/0069* (2013.01); *F16D 2200/0073* (2013.01)

(58) Field of Classification Search
CPC .............................. F16D 69/025; F16D 69/026
See application file for complete search history.

(56) References Cited

U.S. PATENT DOCUMENTS

| | | |
|---|---|---|
| 4,175,070 A | 11/1979 | Klein et al. |
| 4,239,666 A | 12/1980 | Jacko et al. |
| 4,446,203 A | 5/1984 | Okubo et al. |
| 5,156,787 A | 10/1992 | Booher |
| 5,339,931 A | 8/1994 | Jacko et al. |
| 5,891,933 A | 4/1999 | Kesavan et al. |
| 5,962,551 A | 10/1999 | Kobayashi et al. |
| 6,107,386 A | 8/2000 | Nakajima et al. |
| 6,190,761 B1 | 2/2001 | Sasaki et al. |
| 6,228,815 B1 | 5/2001 | Kesavan |
| 6,432,187 B1 | 8/2002 | Ogawa et al. |
| 6,502,674 B2 | 1/2003 | Rheinheimer et al. |
| 6,838,161 B2 | 1/2005 | Tadokoro et al. |
| 7,261,191 B2 * | 8/2007 | Takakusagi ............ C09D 5/084 188/218 R |
| 7,297,728 B2 | 11/2007 | Yamamoto et al. |
| 7,307,047 B2 | 12/2007 | Ogawa et al. |
| 7,326,741 B2 | 2/2008 | Kusaka et al. |
| 8,172,051 B2 | 5/2012 | Subramanian |
| 8,197,585 B2 | 6/2012 | Pearce et al. |
| 8,418,818 B2 | 4/2013 | Ono et al. |
| 8,513,170 B2 | 8/2013 | Kato et al. |
| 8,536,244 B2 | 9/2013 | Schoo et al. |
| 8,863,917 B2 | 10/2014 | Subramanian |
| 8,962,163 B2 | 2/2015 | Shimao et al. |
| 8,962,711 B2 | 2/2015 | Zhang |
| 8,980,974 B2 | 3/2015 | Zhang |
| 9,046,138 B2 | 6/2015 | Kienzle et al. |
| 9,127,733 B2 | 9/2015 | Itami et al. |
| 9,404,546 B2 | 8/2016 | Cox |
| 9,410,951 B2 | 8/2016 | Kusaki et al. |
| 9,441,693 B2 | 9/2016 | Unno et al. |
| 9,464,682 B2 | 10/2016 | Unno et al. |
| 9,464,683 B2 | 10/2016 | Baba et al. |

(Continued)

FOREIGN PATENT DOCUMENTS

| | | |
|---|---|---|
| CN | 1576637 A | 2/2005 |
| CN | 103122959 A | 5/2013 |

(Continued)

OTHER PUBLICATIONS

Peter J. Blau, *Compositions, Functions, and Testing of Friction Brake Materials and Their Additives*, Metals and Ceramics Division, Oak Ridge National Laboratory, Aug. 2001.

*Brake Noise, Vibration and Harshness: Technology Driving Customer Satisfaction*, Akebono Braking Technology, Mar. 2004.

*Ceramic Friction Technology: Origins and Performance Attributes*, Akebono Braking Technology, May 2003.

Gilardi et al., *Copper Substitution and Noise Reduction in Brake Pads: Graphite Type Selection*, Materials, 2012, vol. 5, pp. 2258-2269.

*What Are Brake Pads Made of?*, Olathe Toyota Parts Center, https://parts.olathetoyota.com/whatarebrakepadsmadeof.html, last accessed Aug. 31, 2015.

(Continued)

*Primary Examiner* — Vickey Nerangis
(74) *Attorney, Agent, or Firm* — The Dobrusin Law Firm, P.C.; Bryan S. Lemanski

(57) ABSTRACT

A friction material comprising: (a) at least one lubricant, wherein the at least one lubricant includes an amount of graphite, and wherein at least about 30 percent by weight of the graphite has a particle size of greater than about 500 microns using a sieve analysis; (b) at least one metal containing constituent for imparting reinforcement, thermal conductivity, and/or friction when the friction material is brought into contact with a movable member, wherein the at least one metal containing constituent includes iron and an iron containing compound; (c) a micro-particulated material; (d) one or more filler materials; (e) optionally at least one processing aid; (f) a balance being an organic binder, wherein the organic binder has less than 1 percent by weight of free phenol; wherein the friction material is free of asbestos and substantially devoid of copper.

18 Claims, 2 Drawing Sheets

(56) References Cited

U.S. PATENT DOCUMENTS

| | | | |
|---|---|---|---|
| 9,470,283 | B2 | 10/2016 | Unno et al. |
| 9,534,650 | B2 | 1/2017 | Kuroe |
| 9,656,921 | B2 | 5/2017 | Ki tami et al. |
| 9,689,449 | B2 | 6/2017 | Nagashima |
| 9,863,493 | B2 | 1/2018 | Kikudome et al. |
| 9,879,740 | B2 | 1/2018 | Tironi et al. |
| 9,884,457 | B1 | 2/2018 | Booher |
| 9,897,157 | B2 | 2/2018 | Canuti et al. |
| 9,914,275 | B1 | 3/2018 | Smith |
| 9,914,667 | B2 | 3/2018 | Muroya et al. |
| 9,920,806 | B2 | 3/2018 | Yamamoto et al. |
| 9,926,446 | B2 | 3/2018 | Harada |
| 10,233,988 | B2 | 3/2019 | Kesavan et al. |
| 10,690,207 | B2 * | 6/2020 | Kesavan ............... F16D 69/025 |
| 2002/0012783 | A1 | 1/2002 | Hikichi et al. |
| 2002/0169231 | A1 | 11/2002 | Okayama et al. |
| 2003/0147804 | A1 | 8/2003 | Ogawa et al. |
| 2003/0200898 | A1 | 10/2003 | Ohe et al. |
| 2004/0146702 | A1 | 7/2004 | Shao et al. |
| 2004/0164438 | A1 | 8/2004 | Lamport |
| 2004/0175544 | A1 | 9/2004 | Saikatsu et al. |
| 2005/0014862 | A1 | 1/2005 | Kusaka et al. |
| 2006/0151268 | A1 | 7/2006 | Kesavan et al. |
| 2007/0219289 | A1 | 9/2007 | Phipps et al. |
| 2008/0156226 | A1 | 7/2008 | Kitami et al. |
| 2010/0084232 | A1 | 4/2010 | Subramanian |
| 2011/0092400 | A1 | 4/2011 | Kato et al. |
| 2013/0037360 | A1 | 2/2013 | Chen et al. |
| 2013/0158162 | A1 | 6/2013 | Hatano |
| 2013/0203888 | A1 | 8/2013 | Lu et al. |
| 2013/0228403 | A1 | 9/2013 | Kikudome et al. |
| 2013/0240310 | A1 | 9/2013 | Baba et al. |
| 2013/0289161 | A1 | 10/2013 | Liu et al. |
| 2014/0202805 | A1 | 7/2014 | Unno et al. |
| 2014/0225310 | A1 | 8/2014 | Yaguchi et al. |
| 2014/0342899 | A1 | 11/2014 | Itami et al. |
| 2015/0167764 | A1 | 6/2015 | Bahmata |
| 2015/0267765 | A1 | 9/2015 | Kim et al. |
| 2015/0274930 | A1 | 10/2015 | Jon et al. |
| 2015/0275996 | A1 | 10/2015 | Trombotto |
| 2015/0287753 | A1 | 10/2015 | Sugai et al. |
| 2015/0323028 | A1 | 11/2015 | Canuti et al. |
| 2015/0369314 | A1 | 12/2015 | Filip et al. |
| 2015/0369315 | A1 | 12/2015 | Wall et al. |
| 2015/0369320 | A1 | 12/2015 | Onda et al. |
| 2015/0369321 | A1 * | 12/2015 | Cox ..................... F16D 69/026 188/251 A |
| 2016/0069408 | A1 | 3/2016 | Hattori et al. |
| 2016/0108980 | A1 | 4/2016 | Moore et al. |
| 2016/0108982 | A1 | 4/2016 | Nomoto et al. |
| 2016/0160951 | A1 | 6/2016 | Hattori et al. |
| 2016/0221882 | A1 | 8/2016 | Muroya et al. |
| 2016/0230008 | A1 | 8/2016 | Murai |
| 2016/0230827 | A1 | 8/2016 | Kaji et al. |
| 2016/0245353 | A1 | 8/2016 | Hanaie et al. |
| 2016/0265612 | A1 | 9/2016 | Unno et al. |
| 2016/0273604 | A1 | 9/2016 | Miyaji et al. |
| 2016/0289442 | A1 | 10/2016 | Takada et al. |
| 2016/0298710 | A9 | 10/2016 | Hattori et al. |
| 2016/0312846 | A1 | 10/2016 | Miyaji et al. |
| 2016/0327112 | A1 | 11/2016 | Galimberti et al. |
| 2016/0356332 | A1 | 12/2016 | Yaguchi et al. |
| 2017/0016500 | A1 | 1/2017 | Sin Xicola et al. |
| 2017/0022355 | A1 | 1/2017 | Becquet et al. |
| 2017/0082168 | A1 | 3/2017 | Kesavan et al. |
| 2017/0204920 | A1 | 7/2017 | Poirier et al. |
| 2017/0219037 | A1 | 8/2017 | Yamamoto et al. |
| 2017/0234370 | A1 | 8/2017 | Eindhoven |
| 2017/0234390 | A1 | 8/2017 | Kaji et al. |
| 2017/0248186 | A1 | 8/2017 | Hattori et al. |
| 2017/0253740 | A1 | 9/2017 | Murai et al. |
| 2017/0254378 | A1 | 9/2017 | Takada et al. |
| 2017/0276200 | A1 | 9/2017 | Yagihashi et al. |
| 2017/0284491 | A1 | 10/2017 | Unno et al. |
| 2017/0284492 | A1 | 10/2017 | Unno et al. |
| 2017/0343071 | A1 | 11/2017 | Unno |
| 2018/0010660 | A1 | 1/2018 | Kuroe et al. |
| 2018/0010661 | A1 | 1/2018 | Unno et al. |
| 2018/0031059 | A1 | 2/2018 | Gelb |
| 2018/0031067 | A1 | 2/2018 | Unno et al. |
| 2018/0038436 | A1 | 2/2018 | Kuroe |
| 2018/0045262 | A1 | 2/2018 | Unno et al. |
| 2018/0058528 | A1 | 3/2018 | Canuti et al. |
| 2018/0066168 | A1 | 3/2018 | Kamei |

FOREIGN PATENT DOCUMENTS

| | | |
|---|---|---|
| EP | 0443550 A1 | 8/1991 |
| EP | 0856489 A1 | 8/1998 |
| EP | 1194705 A1 | 4/2002 |
| EP | 2754912 A2 | 7/2014 |
| EP | 2894208 A1 | 7/2015 |
| EP | 2977637 A1 | 1/2016 |
| EP | 2980181 A1 | 2/2016 |
| EP | 3048153 A1 | 7/2016 |
| EP | 3048325 A1 | 7/2016 |
| EP | 3070139 A1 | 9/2016 |
| EP | 3070141 A1 | 9/2016 |
| EP | 3085985 A1 | 10/2016 |
| EP | 3088764 A1 | 11/2016 |
| EP | 3173653 A1 | 5/2017 |
| EP | 3187562 A1 | 7/2017 |
| EP | 3208326 A1 | 8/2017 |
| EP | 3210941 A1 | 8/2017 |
| EP | 3217033 A1 | 9/2017 |
| EP | 3225674 A1 | 10/2017 |
| EP | 3232079 A1 | 10/2017 |
| EP | 3249025 A1 | 11/2017 |
| EP | 3279268 A2 | 2/2018 |
| JP | S59-024778 A | 2/1984 |
| JP | H04-224326 A | 8/1992 |
| JP | H08-337660 A | 6/1995 |
| JP | H10-046137 A | 2/1998 |
| JP | 2000-205318 A | 7/2000 |
| JP | 2000-230168 A | 8/2000 |
| JP | 2000-265158 A | 9/2000 |
| JP | 2001-107027 A | 4/2001 |
| JP | 2004-035871 A | 2/2004 |
| JP | 2004-352978 A | 12/2004 |
| JP | 3855125 B2 | 12/2006 |
| JP | 2007-218395 A | 8/2007 |
| JP | 2007-277418 A | 10/2007 |
| JP | 2009-155439 A | 7/2009 |
| JP | 2010-077341 A | 4/2010 |
| JP | 2010-235730 A | 10/2010 |
| JP | 2010-285558 A | 12/2010 |
| JP | 2011-102381 A | 5/2011 |
| JP | 2013-076058 A | 4/2013 |
| JP | 2014-025014 A | 2/2014 |
| JP | 2015/057454 A | 3/2015 |
| JP | 2017-002109 A | 1/2017 |
| JP | 2017-002110 A | 1/2017 |
| JP | 2017-002185 A | 1/2017 |
| JP | 2017-002186 A | 1/2017 |
| JP | 2017-002230 A | 1/2017 |
| JP | 2017-095646 A | 6/2017 |
| JP | 2017-149971 A | 8/2017 |
| WO | 99/53215 A1 | 10/1999 |
| WO | 2001/012901 A1 | 2/2001 |
| WO | 2002/010069 A1 | 2/2002 |
| WO | 2011/049575 A1 | 4/2011 |
| WO | 2011/049576 A1 | 4/2011 |
| WO | 2012-066968 A1 | 5/2012 |
| WO | 2012/169545 A1 | 12/2012 |
| WO | 2012/169546 A1 | 12/2012 |
| WO | 2013/039183 A1 | 3/2013 |
| WO | 2013/048627 A1 | 4/2013 |
| WO | 2013/084513 A1 | 6/2013 |
| WO | 2014/098215 A1 | 6/2014 |
| WO | 2014/145227 A1 | 9/2014 |
| WO | 2014/145231 A2 | 9/2014 |
| WO | 2014/147807 A1 | 9/2014 |
| WO | 2015/056757 A1 | 4/2015 |
| WO | 2016/004971 A1 | 1/2016 |

(56) References Cited

FOREIGN PATENT DOCUMENTS

| WO | 2016/017488 A1 | 2/2016 |
|----|----------------|--------|
| WO | 2016/039213 A1 | 3/2016 |
| WO | 2016/178192 A1 | 11/2016 |
| WO | 2017/061373 A1 | 4/2017 |
| WO | 2018/037015 A1 | 8/2017 |
| WO | 2017/212029 A1 | 12/2017 |
| WO | 2017/222538 A1 | 12/2017 |

OTHER PUBLICATIONS

Extended European Search Report from the European Patent Office for Application No. 16187867.3-1375, dated Jan. 23, 2017.

Potentially Related Copending U.S. Appl. No. 15/919,294, filed Mar. 13, 2018.

Atsushi Kamifuku et al., "The Brake Abrasion Properties in Two Kinds of Platelet Titanate Compound Formulations, and the Swift Brake Property Evaluation by Using the Thrust Test Method," Proceedings of the 25th Annual Brake Colloquium and Exhibition 2007, SAE International, Oct. 7-10, 2007, pp. 99-103.

Kesavan et al., *Friction Materials*, Encyclopedia of Chemical Processing, 1:1, 1071-83 (2005).

Office Action from the European Patent Office for Application No. 16187867.3-1375 dated Oct. 2, 2018.

\* cited by examiner

FRICTION MATERIAL

FIELD

The present teachings relate to a material composition of a brake pad and/or brake shoe that provides increased braking performance and improves the life of the rotor or drum respectively.

BACKGROUND

The present teachings are predicated upon providing a friction material for use in a brake system (e.g., a disc brake system, a drum brake system, or a combination of both) for use with vehicles. For example, the brake system may be used with almost any vehicle (e.g. car, truck, bus, train, airplane, or the like). Alternatively, the brake system may be integrated into assemblies used for manufacturing or other equipment that require a brake such as a lathe, winder for paper products or cloth, amusement park rides, wind turbines, or the like. However, the present teachings are most suitable for use with a passenger vehicle (e.g., a car, truck, sports utility vehicle, or the like).

Generally, a braking system includes a rotor, a caliper body, a support bracket, an inboard brake pad, and an outboard brake pad that are on opposing sides of the rotor. Typically, the inboard brake pad, the outboard brake pad, and the rotor each include planar friction surfaces so that when the brake pads are in contact with the rotor a friction force is generated. The caliper body further includes one or more fingers, one or more piston bores, and a bridge that connects the one or more fingers to the piston bore or two opposing piston bores together. The piston bore houses a piston. The piston bore has a bore axis that the piston moves along during a brake apply and a brake retract. The piston bore may include a fluid inlet, a closed wall, a front opening, and a cylindrical side wall that includes a seal groove located near the front opening. Typically, the fluid inlet is located in the closed wall of the piston bore so that when pressure is applied the fluid will flow into the piston bore. During a pressure apply the fluid will push the piston towards the front opening and into contact with a brake pad that generally includes a pressure plate and friction material with a planar surface and the friction material will contact a planar surface of the rotor on one side and an opposing brake pad will contact the planar surface of the rotor on an opposing side creating friction to stop rotation of the rotor and any component connected to the brake system.

Another type of braking system includes two brake shoes in the hat of the rotor and/or drum so that when a braking force and/or parking brake force is desired the brake shoes are moved into contact with an inner surface of the hat of the rotor (e.g., a drum-in-hat brake system) and/or drum (drum brake system). Typically, brake shoes pivot on one end and have a link on an opposing end that separates the brake shoes so that the brake shoes are moved into contact with an opposing surface to generate a friction force. The link is connected to a pressure plate on each of the brake shoes so that friction material exposed on the pressure plates directly contacts a surface of the drum and/or hat to generate a friction force.

During these friction events the friction members (e.g., brake pad or brake shoe) contacts a moving part (e.g., rotor or drum respectively) and the friction material gradually slows the moving part until a complete stop is achieved. During the contact between the friction material and the moving part wear occurs so that a portion of the friction material, moving part, or both gradually becomes worn over time. The speed at which the friction material and moving part wear may be increased or decreased based upon the composition of each. The composition of the friction material may be adjusted to increase one property which may result in a decrease in another property. These properties may be balanced in order to provide a friction material that achieves predetermined braking characteristics.

Examples of some friction materials are disclosed in U.S. Pat. Nos. 7,297,728; 8,172,051; and U.S. Patent Application Publication Nos. 2002/0169231; 2004/0146702; 2006/0151268; 2007/0219289; and 2008/156226 and U.S. International Application Nos. WO99/53215; WO2011/049576; and WO2013/048627 all of which are expressly incorporated herein by reference for all purposes. What is needed is a friction material that provides a high level of braking without deteriorating and/or deteriorating the moving part. What is needed is an improved friction material that generates a high level of friction without creating a large amount of brake dust or brake powder. It would be attractive to have a friction material that is bonded together by a material that both keeps all of the materials together but also assists in creating friction.

SUMMARY

One possible embodiment of the present teachings include: A friction material comprising: (a) at least one lubricant, wherein the at least one lubricant includes an amount of graphite, and wherein at least about 30 percent by weight of the graphite has a particle size of greater than about 500 microns using a sieve analysis; (b) at least one metal containing constituent for imparting reinforcement, thermal conductivity, and/or friction when the friction material is brought into contact with a movable member, wherein the at least one metal containing constituent includes iron and an iron containing compound; (c) a micro-particulated material; (d) one or more filler materials; (e) optionally at least one processing aid; (f) a balance being an organic binder, wherein the organic binder has less than 1 percent by weight of free phenol; wherein the friction material is free of asbestos and substantially devoid of copper.

The present teachings may include a combination of one or more of the following: wherein the one or more fillers include at least one functional filler that enhances friction, reduces noise, and improves wear; wherein the at least one functional filler is rubber or cashew; wherein the one or more fillers include at least one non-functional filler; wherein the at least one non-functional filler is a barite, calcium carbonate, or both; wherein the one or more fillers include at least one functional filler and at least one non-functional filler and the at least one non-functional filler does not affect functional characteristics of the functional filler; wherein the one or more fillers include rubber dust, a barite, cashew nut dust, or a combination thereof; wherein the graphite includes a natural graphite, a synthetic graphite, or both; wherein an amount of the iron containing compound by weight exceeds an amount of the lubricant; wherein one of the at least one lubricant is tin sulfide; wherein the tin sulfide is present in an amount from about 1 weight percent to about 10 weight percent and preferably about 2 weight percent to about 5 weight percent of the friction material; wherein the fibers are extruded and chopped or shaved or otherwise cut in predetermined sizes; wherein the at least one metal containing constituent includes magnesium oxide, aluminum, a mineral fiber, or a combination thereof; wherein the friction material is substantially free of steel, and preferably is free of steel; wherein the micro-particulated material has a particle size of about 500 microns or less; wherein the micro-particulated material is substantially pure having metal impurities in an amount of about 100 ppm or less; wherein the at least one processing aid mechanically entangles with particles of the friction material in the green state so that the green state friction material is bound together; wherein the processing aid is an aramid pulp; wherein the processing aid is present in an amount from about 1 percent by weight to about 15 percent by weight, and more preferably from about 3 percent by weight to about 10 percent by weight of the friction material; wherein the organic binder includes formaldehyde in an amount of about 1 percent by weight of the organic binder; wherein the organic binder is substantially free of free formaldehyde; wherein the friction material is formed in a green state and then cured to a final state; wherein the metal sulfide is present in an amount from about 12 weight percent to about 30 weight percent of the friction material; wherein a ratio of the graphite to the iron containing compound is about 3:2; wherein the iron containing compound is a powder having a particle size of about 40 microns or less, preferably about 20 microns or less, or more preferably between about 10 microns and about 1 micron; wherein the micro-particulated material includes at least one metal selected from zinc, calcium, or molybdenum and is in the form of an oxygen containing compound (e.g., oxide or phosphate); wherein the particle size of the lubricant controls compressibility of the brake pad during braking; or a combination thereof.

The present teachings provide a friction material that provides a high level of braking without deteriorating and/or deteriorating the moving part. The present teachings provide an improved friction material that generates a high level of friction without creating a large amount of brake dust or brake powder. The present teachings provide a friction material that is bonded together by a material that both keeps all of the materials together but also assists in creating friction.

DETAILED DESCRIPTION

Figure 1:
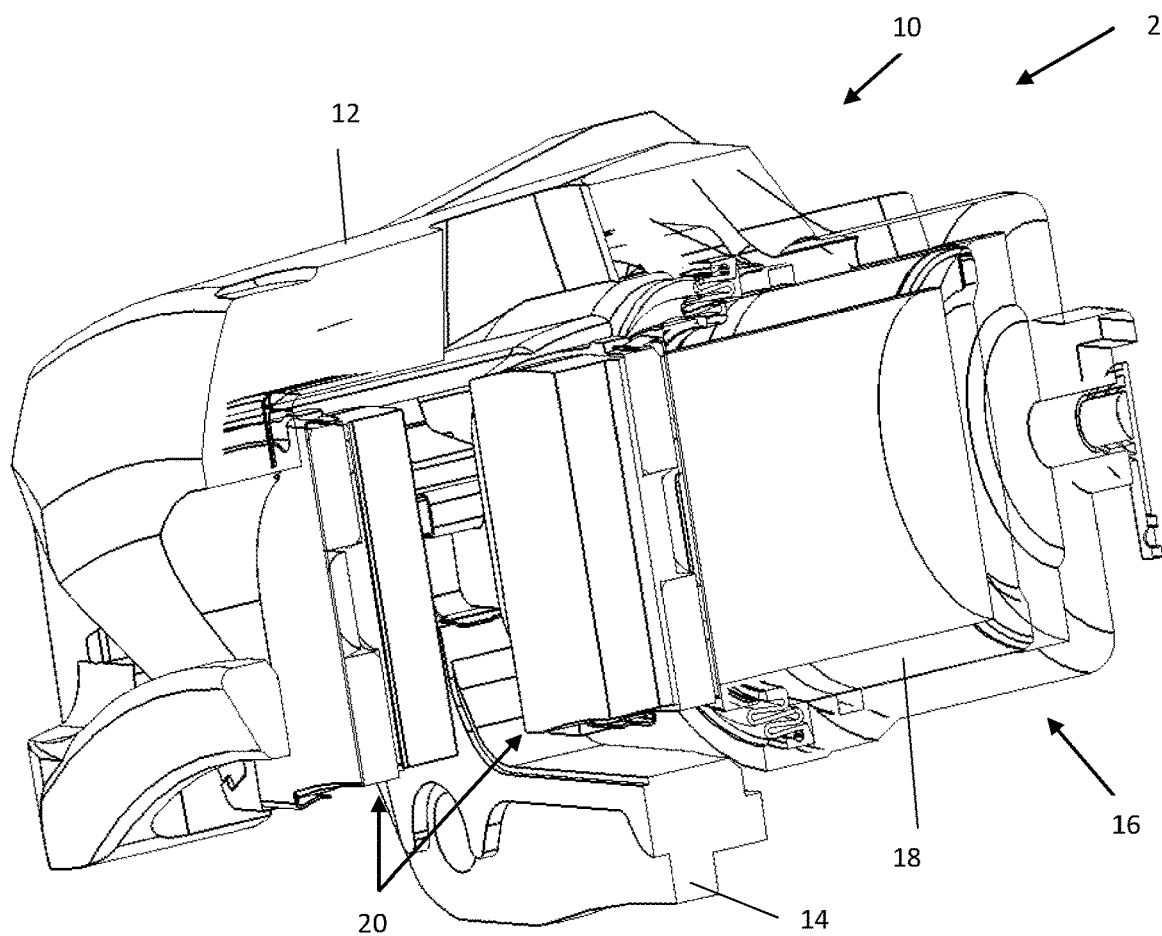
FIG. 1 is a cross-sectional perspective view of a brake system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein relate to one or more improved friction members that work in unison to provide improved braking performance. The one or more friction members may be two or more complementary friction members that are moved into contact to form a brake apply. The one or more friction members may be a brake pad, a brake shoe, or both. The one or more friction members when installed in a system preferably include one or more movable members (e.g., a rotational member) and one or more friction member that are complementary to each other to create a friction force. The movable members may be a rotor, a drum, a hat of a rotor, or a combination thereof. The friction members may be a brake pad, a brake shoe, or both. The one or more friction members may be installed in a brake system. The brake system may be a disc brake system, a drum brake system, a drum-in-hat brake system, or a combination thereof. The brake systems taught herein may include one or more brake pads or brake shoes, preferably two or more brake pads or shoes, and even a plurality of brake pads or shoes.

The brake pads, brake shoes, or both (hereinafter friction members) function to create a braking event. The friction members may function to move from a running state to an apply state so that a friction force is created. Each friction member may include a friction plate and a friction material.

The pressure plate may function to connect to a friction material so that a braking force may be created, the pressure plate may connect the pressure member to a brake system, the pressure plate may move the friction material so that a braking force is generated, or a combination thereof. The pressure plate may provide support for the friction material, provide a point of contact with other brake components, a point for moving the brake pad to create a brake apply, or a combination thereof. The pressure plate may be made of any material so that the pressure plate provides support to friction material, assists in producing a friction force during braking, or both. The pressure plate may be made of metal, a formable material, a stampable material, a composite material, a material with sufficient rigidity to provide support to a friction material during a braking event, or a combination thereof. The pressure plate may have a complementary shape to the friction material, the pressure plate may be flat, arcuate, have a flat surface and be generally arcuate, include one or more recesses for receiving a connector, include one or more recesses for receiving friction material, or a combination thereof. The pressure plate may include one or more connection features so that the pressure plate may be included in a brake system.

The friction material may function to assist in creating a braking force. The friction material may contact a movable member and reduce, eliminate, or both movement of the movable member. The friction material may function to be a point of contact between the pressure member and a movable member (e.g., a rotor, drum, rotational member). The friction material may be applied to the pressure plate using any method and/or material. The connection between the friction material and the pressure plate may be a mechanical connection (e.g., a rivet, a projection, a bolt, a fastener, peened, the like, or a combination thereof), a chemical connection (e.g., adhesive, epoxy, bonding agent, the like, or a combination thereof), or a combination of both. The friction material may be asbestos free, copper free, or both. The friction material may include basalt fibers. The friction material may be compressed materials that are connected to a pressure plate. Preferably, the friction material is a composite of different materials that are compressed together to form a friction material. The composite material may include one or more lubricants, one or more metal containing constituents, one or more micro particulated materials, one or more filler materials, one or more processing aids, one or more binders, or a combination thereof.

The lubricant may be a dry lubricant, a solid lubricant, or both. The lubricant may be a liquid lubricant or may be provided in liquid form. The lubricant may have a layered structure. The lubricant may have a non-layered structure. The lubricant may include one or more atoms selected from, sulfur, nitrogen, carbon, boron, and fluorine. The lubricant may include a metal. The particle size of the lubricant may control compressibility of the brake pad. The lubricant may be provided in a form of a plurality of individual discrete elements (e.g., as powder particles, fibers, flakes, or other elements), either or both may be provided as having a maximum element size when subjected to sieve testing of no greater than about 1000 microns, preferably about 750 microns, or more preferably about 500 microns measured using a sieve analysis. The lubricant may have a particle size ranging from about 1 micron to about 2500 microns, preferably from about 5 microns to about 1000 microns, and more preferably about 10 to about 500 microns measured using a sieve analysis. Most preferably the lubricant may have a particle size ranging from about 200 microns to about 450 microns. The lubricant may have a particle size distribution where the median particle size when sieve testing, by weight, is between about 250 microns to about 350 microns. The lubricant may be present in the friction material at an amount of about 8 percent, about 10 percent by weight or more, about 12 percent by weight or more, about 15 percent by weight or more, or even about 18 percent by weight or more of the friction material. The lubricant may be present in the friction material in an amount of about 40 percent by weight or less, about 35 percent by weight or less, or about 25 percent by weight or less (i.e., between about 8 percent and about 30 percent). The lubricant may be a combination of one or more materials and is preferably a plurality of different materials.

The lubricant may be one or more graphitic materials. For example, the lubricant may be a natural graphite, a synthetic graphite, a combination of a natural graphite and a synthetic graphite (about 2 to about 6 parts by weight of natural graphite to about 6 to about 12 parts by weight synthetic graphite (e.g., about 4 to 9)). Either or both of the natural graphite or the synthetic graphite may be provided in a form of a plurality of individual discrete elements (e.g., as powder particles, fibers, flakes, or other elements), either or both may be provided as having a maximum element size when subjected to sieve testing of no greater than about 2500 microns, about 1000 microns, preferably about 750 microns, or more preferably about 500 microns. Natural graphite may have a particle size ranging from about 1 micron to about 1000 microns, preferably from about 5 microns to about 750 microns, and more preferably about 10 to about 500 microns measured using a sieve analysis. When a natural graphite is used about 20 percent or more, about 30 percent or more, 40 percent or more, or even about 50 percent by weight of the total amount of graphite has a particle size of about 500 microns or greater measured by sieve analysis. The graphite may have a particle size distribution where the median particle size when sieve testing, by weight, is between about 250 microns to about 350 microns. The graphite may be a course graphite and may have a particle size distribution of between about 300 microns and about 500 microns using sieve analysis. The graphite may be a medium graphite and may have a particle size distribution between about 200 microns and about 300 microns using sieve analysis. The graphite may be a fine graphite and may have a particle size distribution of about 50 microns and about 150 microns using sieve analysis. The synthetic graphite may have a particle size of about 500 microns or more but less than about 2500 microns, or less than about 2000 microns using a sieve analysis that are present in an amount of about 10 percent or more, about 20 percent by weight or more, or about 30 percent by weight or more of the total lubricant. The synthetic graphite may have a particle size of about 500 microns or more but less than about 2500 microns, or less than about 2000 microns using a sieve analysis that are present in an amount of about 80 percent or less, about 70 percent by weight or less, or about 60 percent by weight or less of the total lubricant. The natural graphite may have a particle size of between about 5 microns and 1000 microns, and preferably between about 10 microns and about 500 microns using a sieve analysis. Either or both of the natural or synthetic graphite may be regarded as a resilient graphite. The resiliency of a graphite may be about 80% or more, about 90% or more, preferably about 100% or more, about 120% or more, or even about 140% or more. The resiliency of a graphite may be about 200% or less, about 180% or less, or about 160% or less (i.e., preferably between about 100% and about 150%). Resiliency of the graphite is measured by compressing the graphite at a pressure of between about 5,000 kPa to 70,000 kPa and the amount of spring back versus the original shape is measured. The resilient graphite may have a porosity of about 1.0 g/cc or more, about 1.2 g/cc or more, or even about 1.4 g/cc or more. The resilient graphite may have a porosity of about 3.0 g/cc or less, about 2.5 g/cc or less, about 2.0 g/cc or less, or even about 1.8 g/cc or less. The resilient graphite may have a bulk density of about 100 Kg/m$^3$ or more, about 150 Kg/m$^3$ or more, or about 200 Kg/m$^3$ or more. The resilient graphite may have a bulk density of about 600 Kg/m$^3$ or less, about 500 Kg/m$^3$ or less, or preferably about 450 Kg/m$^3$ or less. The resilient graphite may be present in the friction material in a sufficient amount so that the friction material is compressible to dissipate energy during a braking event. Examples of suitable commercial grades of lubricant are sold under the tradename RGC14A from Superior Graphite.

The lubricant may be one or more metal sulfides. The lubricant may be antimony sulfide, tin sulfide, tungsten sulfide, bismuth sulfide, iron sulfide, or a combination thereof. The antimony sulfide when present may be present in an amount of about 1 percent or more, about 2 percent or more, about 3 percent or more, about 4 percent or more, or even about 5 percent by weight of the friction material. The antimony sulfide may be present in an amount of about 20 percent by weight or less, about 15 percent by weight or less, or about 10 percent by weight or less of the friction material (i.e., about 6 percent by weight). The friction material may be free of antimony sulfide, tin sulfide, or both. The antimony sulfide may have a particle size of about 1 micron or more, about 5 microns or more, or about 10 microns. The antimony sulfide may have a particle size of about 100 microns or less, preferably about 75 microns or less, or more preferably about 45 microns or less. The amount of lubricant selected may be sufficient to help minimize noise during standard braking conditions due to contact between a friction material and a movable member. A sufficient amount of lubricant is added so that a noise of about 50 dB or less is created as measured by a simulated L.A. city traffic test. By way of example, the lubricant may be present in an amount about of at least about 1, 2, 3, 4, 5, 6 percent by weight of the friction material but in an amount not to exceed 15, 12, 10 percent by weight of the friction material. If the lubricant is coke the coke may be present in an amount of about 1 to 10 percent by weight and more preferably about 2 to 5 percent by weight. Preferably, the lubricant may be coke, petroleum coke, tin sulfide, graphite, natural graphite, synthetic graphite, resilient graphite, or a combination thereof. Preferably, the lubricant will include either a natural graphite or a synthetic graphite.

The friction material includes at least one metal containing constituent. The at least one metal containing constituent may be an abrasive. The at least one metal containing constituent may have abrasive characteristics (e.g., other materials such as a functional filler may also have abrasive characteristics). The metal containing constituents may be a mineral that includes metal, an oxide, a pure metal, or a combination thereof. The metal containing constituents may be naturally occurring, synthetic, or both. The metal containing constituents may be a fiber, a powder, flake or a combination thereof. Preferably, the metal containing constituent may be in the form of fibers (e.g., a mineral fiber). The fibers may be extruded, chopped, shaves, cut, or formed into a predetermined size. The metal containing constituents may be a powder with a particle size of about 40 microns or less, preferably about 20 microns or less, more preferably about 10 microns or less (e.g., between about 10 microns and 1 micron). The metal containing constituent may include magnesium, magnesium oxide, aluminum, aluminum oxide, a metal containing mineral fiber, iron, basalt, chromium oxide, or a combination thereof. When basalt is used the basalt may include magnesium oxide, aluminum oxide, or both. Preferably, iron is the greatest amount of metal containing constituent. The iron may be in the form of fibers. The fibers may be extruded, chopped, shaves, cut, or formed into a predetermined size. The iron may be a powder. The pure iron constituent to powder constituent may have a ratio. The ratio of pure iron to iron powder may be about 1:1 or more, 2:1 or more, about 3:1 or more. The ratio of pure iron to iron powder may be about 1:2 or more or about 1:3 or more. All of the iron may be pure iron (i.e., 100 percent), all of the iron may be an iron powder (i.e., 100 percent). The iron may be pure iron or an iron oxide (e.g., magnetite). When magnetite is present the magnetite may be present in an amount of about 4 percent by weight or more, 6 percent by weight or more, about 8 percent by weight, 10 percent by weight or more, 12 percent by weight or more, or even about 15 percent by weight or more of the total weight of the friction material. When magnetite is present the magnetite may be present in an amount of about 30 percent or less by weight, about 25 percent or less by weight, or preferably about 20 percent by weight or less of the total weight of the friction material. The iron may be Fe fiber, $Fe_2O_3$, $Fe_3O_4$, or a combination thereof. A ratio of iron to iron containing compounds may be present in the friction material of about 1:1 or more, about 1:2 or more, about 1:3 or more, or even about 1:4 or more. The ratio of iron to iron containing compounds may about 1:1 or less, about 1:0.5 or less, or about 1:0.33 or less. For example, the iron to iron containing compound may be present in an amount of about 1:1.25 and in another example, the ratio of iron to iron containing compound may be about 1:0.66. The metal containing constitute may not be copper, bronze, or a copper containing component. The metal containing constituent is a substantially copper free (i.e., about 0.5 percent by weight or less). The metal containing constituent may be substantially devoid of copper (i.e., about 2 percent by weight or less). Preferably, the metal containing constituent includes zero copper by weight of the total weight of the friction material. The metal containing constituent may be substantially devoid of steel (i.e., about 2 percent by weight or less). The friction material may be substantially free of steel (i.e., about 0.5 percent by weight or less). Preferably the friction material is free of steel that has a Brinnell hardness of about 250 or more.

The one or more metal containing constituents (i.e., total amount of metal containing constituents in the friction material) may be present in the friction material in an amount of about 2 percent by weight or more, about 4 percent by weight or more, preferably about 6 percent by weight or more, more preferably about 10 percent by weight or more, or even more preferably about 12 percent by weight or more. The one or more metal containing constituents (i.e., total amount of metal containing constituents in the friction material) may be present in the friction material in an amount of about 55 percent by weight or less, about 50 percent by weight or less, or about 45 percent by weight or less. The one or more metal containing constituents may be present in a sufficient amount so that under normal braking conditions the friction material has a coefficient of friction of about 0.3 or more, about 0.35 or more about 0.4 or more, about 0.45 or more, or even about 0.5 or more. The one or more metal containing constituents may be present in a sufficient amount so that under normal braking conditions the friction material has a coefficient of friction of about 0.75 or less, preferably about 0.65 or less, more preferably about 0.55 or less. The friction material may include a sufficient amount of metal containing constituents that the friction material has a Brinnell hardness of about 250 HB or less. The metal containing constituents may have a Brinnell hardness of about 750 HB or less, preferably about 500 HB or less, more preferably about 300 HB or less, or most preferably about 250 HB or less. The metal containing constituents may have a Brinell hardness of about 50 HB or more, about 75 HB or more, or even about 100 HB or more. Preferably, the metal containing constituents have a Brinnell hardness of 400 HB or less, and more preferably about 250 HB or less. The friction material may include a sufficient amount of metal containing constituent so that the thermal conductivity of the friction material is about 1 W/mK or more, about 2 W/mK or more, about 3 W/mK or more, or even about 4 W/mK or more. The friction material may include a sufficient amount of metal containing constituent so that the thermal conductivity of the friction material is about 10 W/mK or less, preferably about 7 W/mK or less, or more preferably about 5 W/mK or less.

The friction material may include one or more micro-particulated materials. A sufficient amount of micro-particulated materials may be present in the friction material to prevent the friction material from sticking to other metallic components (e.g., disc or drum). Preferably, the micro-particulated materials are present in a sufficient amount to prevent or inhibit galvanic corrosion so that the friction material does not oxidize, the brake components do not stick together, or both. For example, when the brake is used as a parking brake and the friction material is moved into contact with a drum or rotor and maintained in that position for an extended amount of time the micro-particulated materials inhibit the friction material from sticking to the drum or rotor so that upon the parking brake release free movement is restored. The micro-particulated material may be a multi-functional material. The micro-particulated material may provide friction (i.e., increase the coefficient of friction), provide hardness, resist in corrosion, or a combination thereof. The micro-particulated material may resist corrosion in one or more of the metal containing constituents. The micro-particulated material may provide the same function as the metal containing constituent (i.e., friction) as well as inhibit corrosion. The micro-particulated material may include 1, 2, 3, 4, or more metals that may form a compound. The micro-particulated material may include a phosphate or a silicate. The micro-particulated material may be an oxygen containing compound. The one or more micro-particulated material may include a metalloid. The metalloid may be phosphorous. The micro-particulated material may include a metalloid and oxygen in combination with one or more metals. The micro-particulated material may be a mineral (i.e., natural, synthetic, or both). Preferably, the micro-particulated material is a zinc containing compound, zinc, or both. More preferably, the micro-particulated material is a substantially pure metal (i.e., has metal impurities in an amount of about 100 ppm or less). For example, the micro-particulated material is substantially pure zinc metal powder. The micro-particulated material may include at least one metal selected from zinc, calcium, or molybdenum and is in the form of an oxygen containing compound (e.g., oxide or phosphate). The micro-particulated materials may be a zinc aluminum orthophosphate hydrate, zinc orthophosphate hydrate, a zinc calcium strontium aluminum orthophosphate silicate hydrate, a zinc phosphomolybdate, or a combination thereof. An example of a commercially available micro-particulated material is sold under the trade name Heucophos® ZPA by Heubach. The micro-particulated material may have a particle size of about 500 microns or less, preferably about 250 microns or less, more preferably about 100 microns or less. The micro-particulated material may have a particle size of about 50 microns or less, preferably about 40 microns or less, preferably about 25 microns or less, or more preferably about 15 microns or less. The micro-particulated material may be present in an amount of about 0.1 percent by weight or more, about 0.3 percent by weight or more, about 0.5 percent by weight or more, or even about 1 percent by weight or more of the friction material. The micro-particulated material may be present in an amount of about 2 percent by weight or more, about 3 percent by weight or more, about 5 percent by weight or more, or even about 7 percent by weight or more of the friction material. The micro-particulated material may be present in an amount of about 25 percent by weight or less, about 20 percent by weight or less, about 15 percent by weight or less, or preferably about 10 percent by weight or less of the friction material (i.e., in an amount of between about 0.3 percent by weight and 10 percent by weight).

The one or more filler materials may be present in a sufficient amount so that the fillers enhance friction, reduce noise, improved wear, or a combination thereof. The friction material may include a sufficient amount of filler so that the fillers affect the pore size distribution of the pad so that gases, fluids, or both can escape from the friction material during a braking event. The fillers may provide porosity, compressibility, an area of reduced density, or a combination thereof. The fillers may be softer than the other constituents of the friction material so that during a braking event the fillers allow the brake pad to compress. The volume of the fillers may be reduced during a braking event and so that the friction material has some compressibility. The fillers may conduct heat, extend from one side of a crack in the friction material to a second side of a crack in the friction material, prevent brittleness in the friction material, provide strength to the friction material upon repeated thermal cycling so that the friction material does not have thermal brittleness, or a combination thereof. The fillers may be a barite (baryte), calcium carbonate, titanium dioxide, rubber, cashew nut dust, ceramic fiber fillers, mica, wollastonite, rockwool, perlite, vermiculite, a titanate, or a combination thereof. Preferably, the ceramic fibers. The fillers may be free of antimony, titanium dioxide, a titanate, or a combination thereof. Preferably, the fillers are free of ceramic fillers having a particle size of about 1 micron or less and preferably is free of nanoparticles. More preferably, the fillers are not a bioinsoluble ceramic fiber (i.e., the friction material is free of bioinsoluble ceramic materials). The friction materials may be free of $SiO_2$, $Al_2O_3$, $Al_2$—$SiO_2$, $Al_2O_3$—$SiO_2$—$ZrO_2$, or a combination thereof. Preferably, the friction material is free of fillers that are bioinsoluble fibers or nanoparticles. The one or more fillers may be a functional filler, a non-functional filler, or both.

Preferably, the friction material includes at least one non-functional fillers. The friction material may include at least one functional filler. The non-functional filler may be a barite (baryte), calcium carbonate, wollastonite, rockwool, perlite, vermiculite, or a combination thereof. The non-functional fillers may not change the hardness, coefficient of friction, or both. For example, the non-functional fillers may not change the hardness of the friction material or be hard enough so that during a braking event the fillers assist is braking a moving member. In another example, the non-functional fillers may not increase the coefficient of friction or contribute to the coefficient of friction of the fiction material. The non-functional fillers may be used in conjunction with functional fillers. The non-functional fillers may not have any effect on the functional fillers.

The functional fillers may have a sufficient hardness that the fillers create friction. The functional fillers may contribute to the braking characteristics of the friction material. The functional fillers may increase the coefficient of friction or have a hardness that changes the coefficient of friction of the friction material. Functional fillers may be titanium dioxide, rubber dust, cashew nut dust, sodium molybdate, calcium fluoride, zinc powder, a titanate, a metatitanate, orthotitanate, or a combination thereof. The titanate may be a potassium hexatitanate powder, strontium titanate, lithium titanate, barium titanate, aluminum titanate, sodium titanate, calcium titanate, potassium titanate, or a combination thereof. Preferably, the friction material is free of a titanate. The fillers may be present in an amount of about 1 percent by weight or more, about 5 percent by weight or more, about 10 percent by weight or more, or about 15 percent by weight or more. The fillers may be present in an amount of about 75 percent by weight or less, preferably about 60 percent by weight or less, or about 50 percent by weight or less of the friction material (i.e., between about 5 percent by weight to about 60 percent by weight). The functional filler may comprise about 40 percent by weight or more, about 50 percent by weight or more, about 60 percent by weight or more, or preferably about 65 percent by weight or more of the total weight of the filler (i.e., the non-functional filler may be about 33 percent by weight and the functional filler may be about 67 percent by weight of the total weight of filler).

The friction material may include one or more processing aids. The processing aids may be present in a sufficient amount so that the processing aids create entanglement within the friction material in a green state. The processing aids may create mechanical entanglement in the green state, a cured state, or both. The processing aids may bind the friction material, bind the materials of friction material, or both in the green state. The processing aids may be aramid pulp, cellulose pulp, acrylic pulp, or a combination thereof. The processing aids may be present in an amount of about 1 percent by weight or more, about 5 percent by weight or more, about 10 percent by weight or more, or even about 12 percent by weight or more. The processing aids may be present in an amount of about 20 percent by weight or less, about 15 percent by weight or less, or even about 12 percent by weight or less of the friction material (i.e., between about 3 percent by weight and about 10 percent by weight).

Binder may function to combine together and hold together the one or more materials of the friction material in a green state, a cured state, or both. The binder may function to resist wear during a braking event. The binder may prevent degradation of the friction material due to contact with the environment, with a moving member, or both. The binder may assist in creating a braking force, a braking event, or both. The binder may be a phenolic resin. The binder may be an organic binder. The binder may be present in an amount of about 3 percent or more, about 4 percent or more, about 5 percent or more, about 6 percent or more, about 7 percent or more, about 8 percent or more, or even about 10 percent or more by weight of the total weight of the friction material. The binder may be present in an amount of about 30 percent or less, about 25 percent or less, or about 20 percent or less. The binder may be substantially free of free phenol (i.e., less than about 1 percent by weight of the organic binder in a green state, in a cured state, or both is a free phenol). The binder may be substantially free of formaldehyde (i.e., less than about 1 percent by weight of the organic binder in a green state, in a cured state, or both is formaldehyde). The free phenol, the formaldehyde, or both may be present in an amount of about 0.5 percent by weight or less of the organic binder. Preferably, the binder is free of free phenol, formaldehyde, or both (i.e., not even trace amounts are found in the friction material). Examples of commercially available low phenol resins are available from the Hexion Corporation under the tradenames Durite FD-900A and Cellobond J1011H.

Friction materials in accordance with the materials are made by mixing the ingredients in a Eirich mixer for about 4 minutes, while taking care to prevent clumping or balling of ingredients. The ingredients are moved from the Eirich mixer into a die that is room temperature to preform the ingredients creating a frictional material in a green state. The ingredients, in a green state, are moved from the die into a hot die where the friction material is pressed at about 20 KPa and heated until the melting point of the resin is achieved. The friction material once heated to the melting point of the resin is then removed from the heat and allowed to sit for 4 minutes forming a cured near net shape part. The cured near net shape part is then placed in a post cured oven to completely cure oven at about 200° C. for about 3 hours.

The friction material is tested for resulting characteristics. The friction material is then tested for performance (i.e., coefficient of friction of the friction material), wear life, brake torque variation, and corrosion stiction test. The corrosion stiction test is performed as per JIS D4414 to identify if the friction material sticks to the drum or rotor when maintained in a closed position.

FIG. 1 illustrates a brake system 2 that is a disc brake system 10. The disc brake system 10 includes a caliper 12 and a support bracket 14 that connects the caliper 12 to a component that needs braking such as a vehicle (not shown). The caliper 12 includes a piston bore 16 and a piston 18 that moves within the piston bore 16. A pair of opposing brake pads 20 are located within the disc brake system 10.

Figure 2:
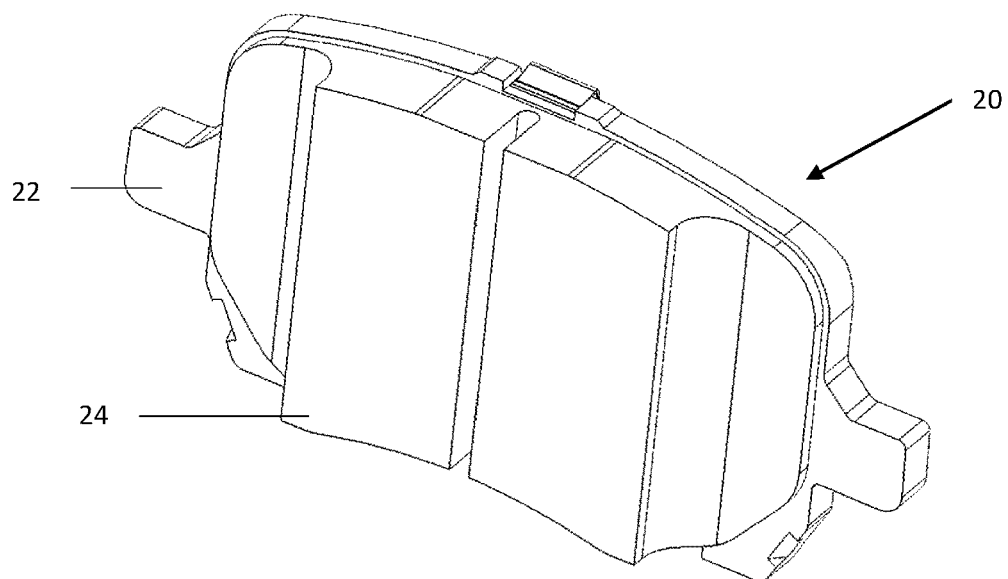
FIG. 2 is a perspective view of a brake pad including friction material.

FIG. 2 is a perspective view of a brake pad 20 including a pressure plate 22 and friction material 24.

Figure 3:
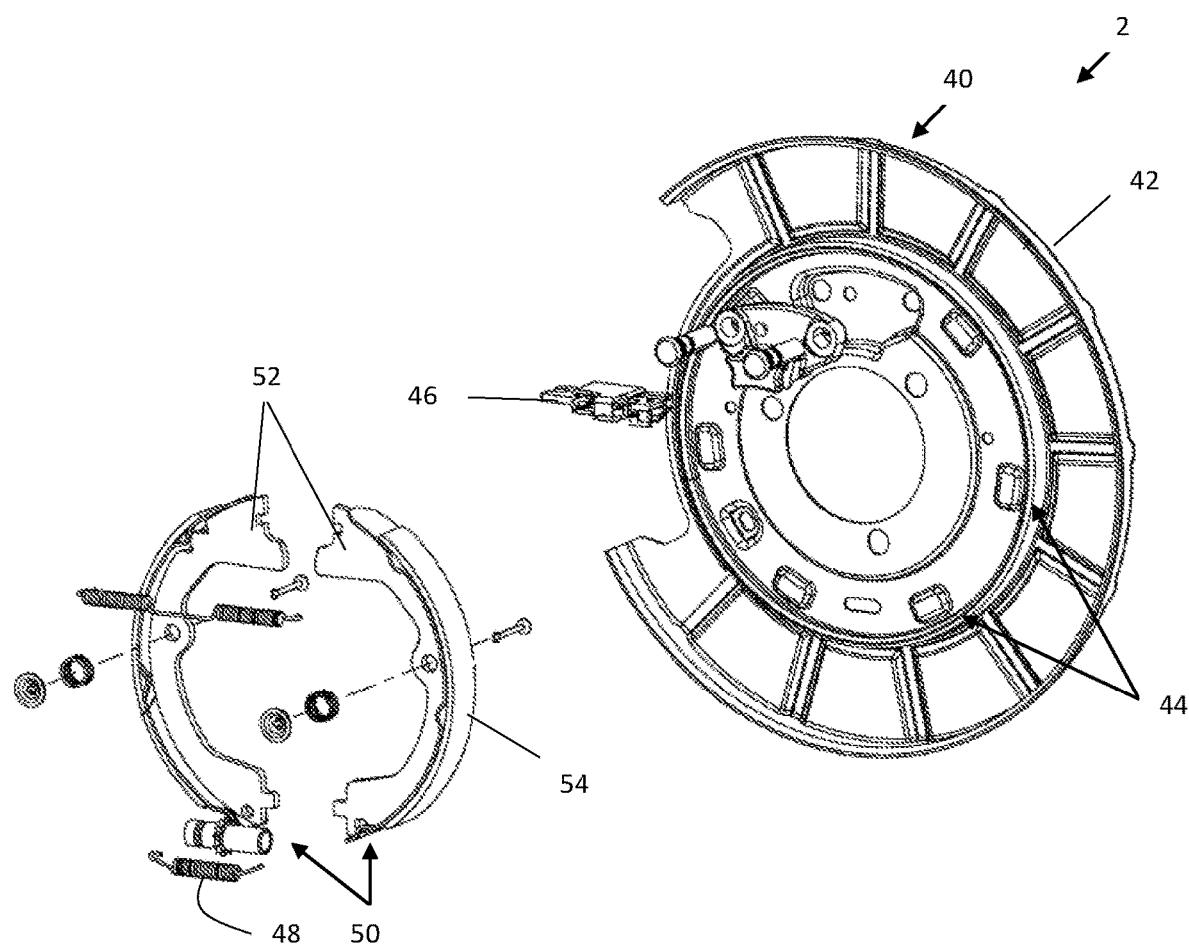
FIG. 3 is an exploded view of a drum brake system including brake shoes.

FIG. 3 illustrates an exploded view of a drum brake 40. The drum brake 40 includes a support plate 42 with lands 44 that assist in connecting the brake shoes 50 within a component that needs braking such as a vehicle (not shown). The brake shoes 50 are connected at a top end by a link 46 that moves and a bottom end by a spring 48 that also permits the brake shoes 50 to move. The brake shoes 50 include a pressure plate 52 and friction material 54.

Examples

|  | A | B | C | D | E | F | G | H | I | J | K | L | M | N |
|---|---|---|---|---|---|---|---|---|---|---|---|---|---|---|
| Phenolic Resin | 9 | 9 | 7.5 | 8 | 9.5 | 8 | 10 | 9 | 5 | 6 | 7 | 8 | 8 | 8 |
| Rubber Dust | 5 | 4 | 4 | 2 | — | 5 | 1 | 8 | 6 | 2 | 3 | 6 | 2 | 2 |
| Cashew Nut Shell Friction Dust | 3 | 6 | 5 | 5 | 4 | 6.5 | 8 | 4.5 | 6 | 4 | 2 | 6 | 4 | 4 |
| Petroleum Coke | 4 | 3 | 4 | 6 | 3 | 3 | 7 | 6 | 5 | — | 3 | 5 | 1 | 3 |
| Tin Sulfide | 2 | 3 | 4 | 4 | 2.5 | 4 | — | 1 | 3 | 4 | 4 | 5 | 4 | 3 |
| Molybdenum disulfide | 8 | 3 | — | 3 | — | 2 | 5 | 1 | 2 | 3.5 | 3 | 4 | 6 | 3 |
| Potassium hexatitanate powder | — | — | 9 | 10 | 10 | — | 2 | 6 | 4 | 3 | — | — | 1 | — |
| Zinc Aluminum Orthophosphate hydrate | 5 | — | 5 | 6 | 7 | 6 | 5.5 | 1 | 1 | — | 6 | 6 | 4 | 6 |
| Aramid pulp | 3 | 4 | 4 | 3 | 3.5 | 3 | 5 | 2 | 4 | 4.5 | 3 | 4 | 2.5 | 3 |
| Zinc powder | 6 | 6 | 5 | 4 | 5 | 3 | 7 | 6 | 3 | 7 | 4 | 6 | 5 | 6 |
| Iron fiber | 5 | 6 | 3 | 4 | 5 | 6 | 4 | 7 | 2 | 3 | 8 | 4 | 12 | 5 |
| Magnetite | 5 | 9 | 6 | 8 | 9 | 10 | 9 | 9 | 12 | 10 | 3 | 9 | — | 3 |
| Mineral Fiber | 6 | 6 | — | — | 6 | 5 | 3 | 2 | 4 | 5 | — | 4 | 5 | 3 |
| Graphite | 6 | 4 | 6 | 6 | 5 | 5 | 9 | 2 | 3 | 7 | 8 | 5 | 4 | 3 |
| Synthetic Graphite | 4 | 7 | 7 | 6 | 3 | 4 | 2 | 8 | 4 | 6 | 5 | 3 | 2 | 7 |
| Magnesium Oxide | — | 2 | 3 | 2 | 2 | 3 | 2 | 4 | — | 1 | 7 | 4 | 9 | 2 |
| Monoclinic Zirconia | 4 | 8 | 5 | 5 | 5 | 8 | 7 | 10 | — | 8 | 6 | 6 | 7 | 10 |
| Barytes | 5 | 7 | 7 | — | 2 | 1.5 | — | 2 | 2.5 | 3 | 5 | — | 4 | 7 |
| Basalt | — | — | — | 3 | 5 | 2 | 5 | — | 6 | 2 | 2 | 4 | 3 | 4 |
| Calcium Silicate | 2 | 2 | 4 | 2 | 1.5 | 2 | — | 0.5 | 3.5 | 5 | 7 | — | 3 | 2 |
| Bismuth Sulfide | — | — | — | 3 | 4 | — | — | 4 | 5 | 5 | 2.5 | 3 | 2 | 4 |
| Iron Sulfide | 3 | 4 | — | — | 3 | 4 | 5 | — | 6 | 4 | — | — | 4 | 4 |
| Zirconium Silicate | 4 | 2 | 2.5 | 4 | 3 | 2 | 0.5 | 4 | 3 | — | 2 | 3 | — | 2 |
| Calcium Carbonate | 5.5 | — | 5 | 4 | — | 2 | — | 1 | — | 2 | 3 | — | 2 | 6 |
| Sodium Molybdate | 1.5 | — | — | 2 | 2 | 2 | 1 | — | 3 | — | 1 | — | 4 | 2 |

-continued

|  | A | B | C | D | E | F | G | H | I | J | K | L | M | N |
|---|---|---|---|---|---|---|---|---|---|---|---|---|---|---|
| Calcium Fluoride | 2 | 2 | 2 | — | — | — | — | 2 | 3 | — | 3 | 2 | 1.5 | — |
| Manganese Sulfide | 2 | 3 | 2 | — | — | 3 | 2 | — | 4 | 5 | 2.5 | 3 | — | — |
| Copper | — | — | — | — | — | — | — | — | — | — | 0.5 | — | — | — |
| Asbestos | — | — | — | — | — | — | — | — | — | — | — | — | — | — |

*All of the values in the table are weight percent unless otherwise stated.

The above are tested for meeting the following three requirements: (1) performance, (2) wear life, and (3) brake torque variation. Each of the friction materials passed each of these three tests.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

The components express their composition in a percent by weight. Even through the compositions do not express a relative ratio between components such ratios are within the scope of the teachings. By way of example, if element A is in an amount of about 10 percent by weight and element B is in an amount of about 2 percent by weight of the total composition the teachings herein contemplate a ratio of about 4:1 for A to B. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A friction material comprising:
   at least one lubricant, wherein the at least one lubricant includes an amount of graphite that has a particle size of no greater than about 500 microns using a sieve analysis;
   metal containing constituents for imparting reinforcement, thermal conductivity, and/or friction when the friction material is brought into contact with a movable member, wherein the metal containing constituents include iron and an iron containing compound;
   a micro-particulated material that is zinc phosphomolybdate;
   one or more filler materials that include rubber; and
   a balance being an organic binder, wherein the organic binder has less than 1 percent by weight of free phenol;
   wherein the friction material is free of steel and is substantially devoid of copper.

2. The friction material of claim 1, wherein the one or more filler materials are present in an about from about 5 weight percent to about 60 weight percent of the friction material.

3. The friction material of claim 1, wherein the friction material is substantially free of antimony, titanium dioxide, ceramic fiber filler, or a combination thereof.

4. The friction material of claim 1, wherein the friction material is substantially free of titanate.

5. The friction material of claim 1, wherein the at least one lubricant includes a metal sulfide.

6. The friction material of claim 5, wherein the at least one lubricant includes a metal sulfide that is present in an amount from about 8 weight percent to about 30 weight percent of the friction material.

7. The friction material of claim 1, wherein a ratio of the at least one lubricant to the at least one metal containing constituent is about 2:1.

8. The friction material of claim 1, wherein the friction material is free of antimony or antimony sulfide.

9. The friction material of claim 1, wherein the at least one metal containing constituent is present in an amount from about 6 weight percent to about 45 weight percent of the friction material.

10. The friction material of claim 1, wherein the at least one metal containing constituent has a hardness of about 250 or less on the Brinell hardness scale.

11. The friction material of claim 1, wherein the friction material includes at least one multifunctional component that aids in resistance of corrosion and creating friction.

12. The friction material of claim 1, wherein the micro-particulated material resists corrosion of the at least one metal containing constituent.

13. The friction material of claim 1, wherein the micro-particulated material is present in an amount from 0.3 weight percent to about 10 weight percent of the friction material.

14. The friction material of claim 1, wherein the organic binder includes free phenol and free formaldehyde each in an amount of less than about 1 percent by weight of the organic binder in a green state, in a cured state, or both.

15. The friction material of claim 14, wherein the free phenol and the free formaldehyde are each present in an amount of less than about 0.5 percent by weight of the organic binder.

16. The friction material of claim 1, wherein the one or more filler materials are calcium fluoride.

17. A friction material comprising:

at least one lubricant, wherein the at least one lubricant includes an amount of graphite that has a particle size of no greater than about 500 microns using a sieve analysis;

metal containing constituents for imparting reinforcement, thermal conductivity, and/or friction when the friction material is brought into contact with a movable member, wherein the metal containing constituents includes iron and an iron containing compound;

a micro-particulated material that is zinc phosphomolybdate;

one or more filler materials that include rubber, wherein the one or more filler materials include a functional filler that enhances friction when the friction material is brought into contact with the movable member and a non-functional filler that imparts no change on a coefficient of friction of the frictional material; and a balance being an organic binder, wherein the organic binder has less than 1 percent by weight of free phenol;

wherein the friction material is free of steel and is substantially devoid of copper.

18. The friction material of claim 17, wherein the friction material is substantially free of antimony, titanium dioxide, ceramic filler having a particle size of about 1 micron or less, or a combination thereof.

* * * * *